Patented Apr. 10, 1934

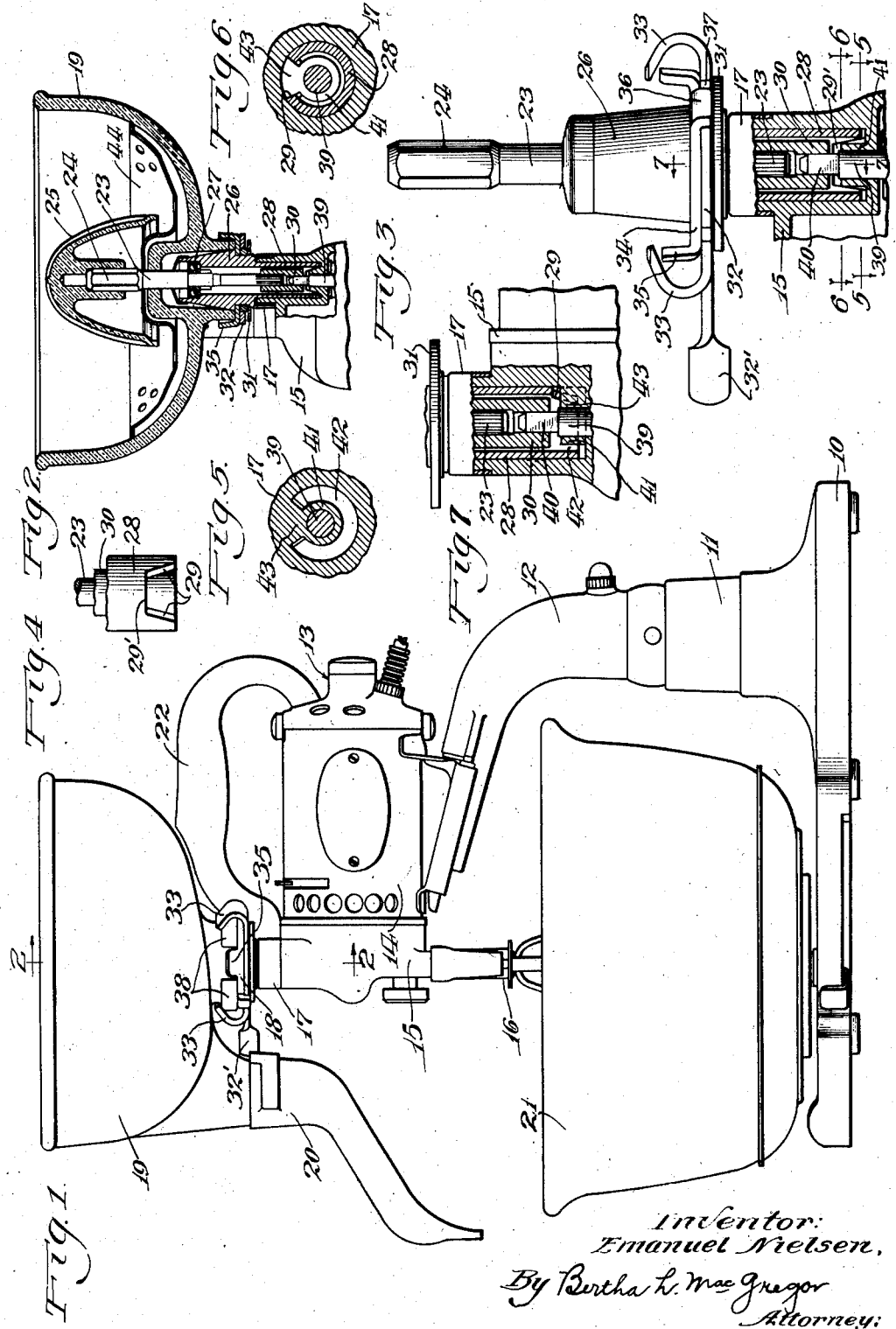

1,954,258

UNITED STATES PATENT OFFICE 1,954,258

FRUIT JUICE EXTRACTOR DRIVE MECHANISM

Emanuel Nielsen, Racine, Wis., assignor to Hamilton Beach Manufacturing Company, Racine, Wis., a corporation of Wisconsin Application May 23, 1932, Serial No. 612,886

4 Claims. (Cl. 259—104)

This invention relates to combination food mixers and fruit juice extractors, and more particularly to means for driving the juice extractor.

One of the objects of the invention is to provide means for driving the fruit juice extractor from one of the vertical shafts by which the food mixer agitators are rotated.

Another object is to produce a combination coupling and clamping device for operatively and detachably connecting a driven shaft with the extractor drive shaft and for carrying and supporting the extractor bowl.

The combination extractor drive shaft, coupling and bowl-carrying device is adapted to be seated in a socket in the top of the gear casing of the food mixer, whereby a driving connection between the extractor shaft and a driven shaft in the gear casing is conveniently established.

In the drawing:—

Fig. 1 is a side elevation of a combination food mixer and juice extractor embodying my invention.

Fig. 2 is a transverse, vertical section taken on the line 2—2 of Fig. 1.

Fig. 3 is an enlarged elevation, partly in section, of the extractor drive shaft, drive coupling and bowl clamping device of my invention, the clamping means being in the released position.

Fig. 4 is a fragmentary elevation of the lower end of the drive coupling.

Fig. 5 is a horizontal cross section taken on the line 5—5 of Fig. 3.

Fig. 6 is a horizontal cross section taken on the line 6—6 of Fig. 3.

Fig. 7 is a vertical sectional view, partly in elevation, taken on the line 7—7 of Fig. 3.

As illustrative of the device in which is embodied the invention sought to be protected by this application, I have shown in Fig. 1 a combination food mixer and juice extractor, in which the horizontally disposed base is indicated at 10, an upright socket, integral with the base, at 11, a pivotally mounted arm at 12, and a motor driven food mixer, detachably mounted on the arm, at 13. The food mixer comprises a motor 14, carrying a gear casing 15, and a detachable agitator or beater unit 16. The motor is operatively connected with the agitators beneath the gear casing and with the juice extractor above the gear casing. The gear casing 15 is provided with a socket 17 which receives the coupling which operatively and removably connects the reamer drive shaft to a driven shaft in the gear casing. The reamer drive shaft and coupling carry the supporting and clamping device 18 for the bowl 19. The bowl is provided with a spout 20. The food mixer bowl is indicated at 21, and a handle on the motor, at 22.

It will be understood that the invention herein shown, described and claimed may be embodied in food mixers of various construction, and is not limited to the particular combination in which it is illustrated herein, in Fig. 1.

Novel features of construction of the combination food mixer and juice extractor, not claimed herein, are the subject of applications co-pending herewith.

Referring now to that part of the construction which is the subject of this invention, 23 indicates the extractor shaft, 24 the hexagonally shaped end of the shaft, and 25 the reamer mounted on said end 24. The shaft 23 extends downwardly through a bearing casing 26 and ball bearing 27 and is rotatably mounted therein.

The bearing casing 26 terminates, at its lower end, in a tubular member 28, of smaller external diameter than the part 26, and cut away at one side of its end as indicated at 29. The lower end of the extractor shaft 23 has fixed to it a sleeve 30 which projects below the end of the shaft 23 and is internally square in cross section. The lower end of the sleeve 30 is above the upper edge 29' of the cut away side of the tubular member 28.

The bearing casing 26, just above the tubular member 28, carries a fixed washer 31, a movable clamping plate 32 carrying clamping hooks 33, and a fixed, bowl-supporting plate 34 with upturned ears 35. A handle or lever 32' is attached to the movable plate 32. When the clamping plate 32 has been moved into the position shown in Fig. 3 with the clamp hooks 33 radially opposite the ears 35, and the downturned stop 36 on the plate 34 in contact with the projection 37 on said movable plate 32, the bowl 19 can be placed into position on the plate 34. The bowl has two circumferentially spaced flanges 38 (Fig. 1) on its base, the space between the flanges being such as to accommodate the hooks 33 and ears 35 when in the position shown in Fig. 3. When the bowl has been positioned, the lever 32' is moved into the position shown in Fig. 1, so that the clamping hooks 33 engage the flanges 38 of the bowl and hold it firmly on the plate 34.

The agitator 16, in the present embodiment, comprises two beater shafts operatively connected with the motor. Each is rotated by a vertically disposed driven shaft mounted in the gear casing 15. One of these vertical driven shafts 39 is extended upwardly into the socket 17, and terminates, in the socket, in an end 40, square in cross section, and adapted to fit within the end of the sleeve 30 when the bearing member 26—28 is in operative position.

The shaft 39 is rotatable in a tubular bearing 41 which rises within the socket 17. An annular space 42 (Fig. 5) extends around the major part of the bearing 41, but at one side said bearing is integral with the socket wall 17, the web 43 being shaped to fit between the edges 29, 29 of the tubular member 28.

The assembled extractor shaft 23 and bearing casing 26—28 carrying the bowl supporting and clamping device 32, 34, are mounted on the food mixer by simply placing the tubular end 28 into the socket 17, turning the same until the cut away portion 29 fits over the web 43, whereupon the end 40 of the shaft 39 engages the sleeve 30 on the extractor shaft 23. When the shaft 39 is rotated, rotary motion is transmitted to the extractor shaft 23 for actuating the reamer 25.

In order to disconnect the extractor drive shaft 23 from the driven shaft 39, the entire combination drive coupling and bowl clamping unit, with the bowl and reamer mounted thereon, may be bodily lifted from the socket 17 of the food mixer, or if desired, the reamer may be first removed, then the strainer 44 may be lifted out of the bowl, and the bowl unclamped and removed from the hooks 33 and plate 34, and finally the coupling and clamping device may be lifted from the socket 17. The arrangement is such that fruit juices cannot contact with the metallic drive coupling and bowl clamping device, and all of the parts are easily assembled and disassembled.

The parts being separable, the bowl may be washed without bringing the metal parts into contact with the water, where the lubricant in the bearing casing would become dissipated and the metal might be affected by the fruit juices.

Changes may be made in details of construction without departing from the scope of my invention and I do not intend to be limited to the exact form shown and described, except as set forth in the appended claims.

I claim:—

1. A combination food mixer and juice extractor comprising a horizontally disposed motor, a gear casing secured to one end of the motor, an agitator depending from the gear casing, a vertically disposed driven shaft in the gear casing operatively connected with the motor and the agitator, a portable bearing housing having means non-rotatably supported in a socket in said gear casing, an extractor shaft rotatably mounted in the bearing housing, a bowl-supporting and engaging means operatively mounted on and extending radially from the bearing housing, a reamer on the upper end of the extractor shaft, and means on the lower end of said shaft for detachably and operatively engaging the vertical shaft in the gear casing.

2. A combination food mixer and juice extractor comprising a horizontally disposed motor, a gear casing secured to one end of the motor, an agitator depending from the gear casing, a vertically disposed driven shaft in the gear casing operatively connected with the motor and the agitator, a portable bearing housing, an extractor shaft rotatably mounted in the bearing housing, a bowl-supporting and engaging member mounted on and extending radially from the bearing housing, a reamer on the upper end of the extractor shaft, and means on the lower end of said shaft for detachably and operatively engaging the vertical shaft in the gear casing, said bowl-supporting and engaging member comprising a pair of apertured discs surrounding and fixed to the bearing housing, the upper one having upturned projections, and a clamping member movably mounted on the housing between said discs and engaging a mixing bowl to non-rotatably hold same on the bearing in predetermined position.

3. A combination food mixer and juice extractor comprising a horizontally disposed motor, a gear casing secured to one end of the motor, an agitator depending from the gear casing, a vertically disposed driven shaft in the gear casing operatively connected with the motor and the agitator, with its upper end extending into a socket formed in the gear casing, a portable bearing housing having a lower end adapted to fit into the gear casing socket and held non-rotatably therein, an extractor shaft rotatably mounted in the bearing housing, bowl-supporting and engaging means on the housing between its ends, means operatively carried by said last mentioned means for non-rotatably securing a bowl in spaced relation to said motor and gear casing, a reamer on the upper end of the extractor shaft, and means for operatively connecting the lower end of the extractor shaft with the vertical shaft in the gear casing, said means comprising a sleeve on the lower end of the extractor shaft, located within the bearing housing and above the lower margin of the housing.

4. A combination food mixer and juice extractor comprising a horizontally disposed motor, a gear casing secured to one end of the motor, an agitator depending from the gear casing, a vertically disposed driven shaft in the gear casing operatively connected with the motor and the agitator, with its upper end extending into a socket formed in the gear casing, a portable bearing housing having a lower end adapted to fit into the gear casing socket and held non-rotatably therein, an extractor shaft rotatably mounted in the bearing housing, bowl-supporting and engaging means on the housing between its ends, means operatively carried by said last mentioned means for non-rotatably securing a bowl in spaced relation to said motor and gear casing, a reamer on the upper end of the extractor shaft, and means for operatively connecting the lower end of the extractor shaft with the vertical shaft in the gear casing, said means comprising a sleeve on the lower end of the extractor shaft, located within the bearing housing and above the lower margin of the housing, the gear casing socket having a projection on its wall for engaging a recess in the lower end of the bearing housing to prevent rotation of the bearing housing.

EMANUEL NIELSEN.